United States Patent
Lindgren et al.

(10) Patent No.: US 12,196,216 B2
(45) Date of Patent: Jan. 14, 2025

(54) COMPRESSOR ARRANGEMENT, TURBOCHARGER, COMBUSTION ENGINE, AND VEHICLE

(71) Applicant: Scania CV AB, Södertälje (SE)

(72) Inventors: Magnus Lindgren, Älvsjö (SE); Christian Meinking, Enhörna (SE); Erik Bodin-Ek, Älvsjö (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 18/697,087

(22) PCT Filed: Sep. 30, 2022

(86) PCT No.: PCT/SE2022/050876
§ 371 (c)(1),
(2) Date: Mar. 29, 2024

(87) PCT Pub. No.: WO2023/059245
PCT Pub. Date: Apr. 13, 2023

(65) Prior Publication Data
US 2024/0401600 A1    Dec. 5, 2024

(30) Foreign Application Priority Data

Oct. 5, 2021 (SE) .................................. 2151219-9

(51) Int. Cl.
*F04D 27/02* (2006.01)
*F02B 37/12* (2006.01)
(Continued)

(52) U.S. Cl.
CPC .......... *F04D 27/0215* (2013.01); *F02B 37/12* (2013.01); *F04D 29/284* (2013.01); *F04D 29/4206* (2013.01); *F04D 29/661* (2013.01)

(58) Field of Classification Search
CPC .............. F04D 27/0215; F04D 29/284; F04D 29/4206; F04D 29/661; F02B 37/12
See application file for complete search history.

(56) References Cited

U.S. PATENT DOCUMENTS 7,624,575 B2 * 12/2009 Noelle .................... F02M 26/12
60/605.1
8,287,233 B2 * 10/2012 Chen .................... F04D 29/4213
415/206

(Continued)

FOREIGN PATENT DOCUMENTS

EP    2832974 A1    2/2015
EP    3366901 A1    8/2018

(Continued)

OTHER PUBLICATIONS

Scania CV AB, International Patent Application No. PCT/SE2022/050876, International Search Report, Oct. 27, 2022.

(Continued)

*Primary Examiner* — Jesse S Bogue
(74) *Attorney, Agent, or Firm* — Moore & Van Allen PLLC; W. Kevin Ransom (57) ABSTRACT

A compressor arrangement for a turbocharger is disclosed. The compressor arrangement comprises a compressor housing and a compressor wheel arranged to rotate in the compressor housing. The compressor housing comprises a compressor inlet duct, a ported shroud, and a recirculation channel comprising an inlet arranged downstream of the compressor wheel, an outlet arranged in the compressor inlet duct at a position upstream of ports of the ported shroud, and a valve configured to control the flow of air through the recirculation channel. The compressor arrangement further comprises a wall section protruding into the compressor inlet duct at a position upstream of the outlet of the recir- (Continued)

culation channel. The present disclosure further relates to a turbocharger, an internal combustion engine, and a vehicle.

11 Claims, 2 Drawing Sheets

(51) Int. Cl.
*F04D 29/28* (2006.01)
*F04D 29/42* (2006.01)
*F04D 29/66* (2006.01)

(56) References Cited

U.S. PATENT DOCUMENTS

| | | |
|---|---|---|
| 10,316,859 B2 * | 6/2019 | Harris ............... F02B 39/02 |
| 10,900,498 B1 | 1/2021 | Hu et al. |
| 11,066,982 B2 * | 7/2021 | Tomita ............. F04D 27/0215 |
| 11,378,095 B2 * | 7/2022 | Hayashi ............ F04D 29/4213 |
| 11,965,516 B1 * | 4/2024 | Schwarz ........... F04D 29/4213 |
| 2011/0255952 A1 | 10/2011 | Williams et al. |
| 2018/0066573 A1 | 3/2018 | Ehrmann et al. |

FOREIGN PATENT DOCUMENTS

| | | |
|---|---|---|
| EP | 3473862 A1 | 4/2019 |
| EP | 3760849 A1 | 1/2021 |

OTHER PUBLICATIONS

Scania CV AB, International Patent Application No. PCT/SE2022/050876, Written Opinion, Oct. 27, 2022.

* cited by examiner

COMPRESSOR ARRANGEMENT, TURBOCHARGER, COMBUSTION ENGINE, AND VEHICLE

CROSS-REFERENCE TO RELATED APPLICATIONS

This application is a National Stage Patent Application (filed under 35 § U.S.C. 371) of PCT/SE2022/050876, filed Sep. 30, 2022, of the same title, which, in turn claims priority to Swedish Patent Application No. 2151219-9 filed Oct. 5, 2021, of the same title; the contents of each of which are hereby incorporated by reference.

TECHNICAL FIELD

The present disclosure relates to compressor arrangement for a turbocharger. The present disclosure further relates to a turbocharger for an internal combustion engine, an internal combustion engine comprising a turbocharger, and a vehicle comprising an internal combustion engine.

BACKGROUND

A turbocharger is a device used to compress air to an inlet of a combustion engine. A turbocharger comprises a compressor unit and a turbine unit. The compressor unit comprises a compressor housing and a compressor wheel rotatably arranged in the compressor housing. The turbine unit comprises a turbine housing and a turbine wheel rotatably arranged in the turbine housing. Exhaust gases from the engine are ducted through the turbine housing to spin the turbine wheel. The turbine wheel is connected to the compressor wheel, usually via a shaft. The compressor wheel is arranged to compress air to an inlet of the engine. Some engines comprise a charge air cooler between the compressor unit and the inlet of the engine.

A turbocharger is an efficient means for compressing air to an inlet of an engine because the turbocharger utilizes energy of the exhaust gases of the engine. By using a turbocharger on an engine, the performance of the engine can be increased, and the fuel efficiency of the engine can be increased.

Turbochargers are also associated with some problems and drawbacks. One problem is commonly known as surge. Surge appears when a pressure ratio over the compressor wheel is high and the air flow over the compressor wheel is low. If so, a flow instability is induced in the compressor housing and the air tends to go backward over the compressor wheel. This may for example occur when a driver backs off the throttle too fast, for example when changing gears, and can be heard as a fluttering noise.

Surge can damage components of the turbocharger, such as bearings of the turbocharger and the compressor wheel. Moreover, surge is not desired since it generates noise, limits the life span of the turbocharger and risks breakdown of the turbocharger. Furthermore, since the turbocharger should not operate in a surge range of the turbo map where surge is likely to occur, it narrows the field of operation, limits the performance, and limits gear shifting speed.

The occurrence of surge can be reduced by arranging the compressor of a turbocharger with a recirculation arrangement comprising a recirculation channel connected to a high-pressure side and to a low-pressure side of the compressor and a recirculation valve arranged to control the flow of air through the recirculation channel. By opening the recirculation valve when there is a high-pressure ratio over the compressor, such as when an inlet throttle of the engine is closing, surge can be avoided.

Another way of reducing the occurrence of surge is to provide the compressor with a so-called ported shroud. Normally, a ported shroud comprises one or more ports arranged radially outside of the compressor wheel which is/are fluidly connected to one or more ports arranged immediately upstream of the compressor wheel. In this manner, air can flow from the port/ports radially outside of the compressor wheel to the port/ports arranged upstream of the compressor wheel which can widen the operational range and the flow width of the compressor. Moreover, a ported shroud can reduce the occurrences of surge upon small changes in the pressure difference over the compressor and at steady state conditions. However, a recirculation arrangement of the type explained above, is usually more efficient in mitigating surge at more transient conditions, such as when an inlet throttle of the engine is closing, than a ported shroud.

A problem associated with recirculation arrangements, as well as with ported shrouds, is that these arrangements may generate noise that propagates to the surroundings via an air inlet duct of the engine. That is, the flow of air through ports of a ported shroud, as well as the flow of air through an outlet of the recirculation channel, may generate a lot of noise due to high flow rate of air through the port/outlet.

Another problem associated with recirculation arrangements is that some types of recirculation arrangements may have a negative impact on the rotor stability of the compressor wheel when the valve thereof is opened.

SUMMARY

It is an object of the present invention to overcome, or at least alleviate, at least some of the above-mentioned problems and drawbacks.

According to a first aspect of the invention, the object is achieved by a compressor arrangement for a turbocharger. The compressor arrangement comprises a compressor housing and a compressor wheel arranged to rotate in the compressor housing. The compressor housing comprises a compressor inlet duct. The compressor housing further comprises a ported shroud including a first port positioned upstream of a leading side of the compressor wheel, a second port positioned downstream of the leading side of the compressor wheel, and a ported shroud channel extending between the first port and the second port. The compressor arrangement comprises a recirculation channel comprising an inlet arranged downstream of the compressor wheel, an outlet arranged in the compressor inlet duct at a position upstream of the first and second ports of the ported shroud, and a valve configured to control the flow of air through the recirculation channel. The compressor arrangement further comprises a wall section protruding into the compressor inlet duct at a position upstream of the outlet of the recirculation channel.

Since the compressor arrangement comprises the wall section protruding into the compressor inlet duct at a position upstream of the outlet of the recirculation channel, a compressor arrangement is provided capable of attenuating noise generated by the flow of air through the outlet of the recirculation channel in an efficient manner. In addition, a compressor arrangement is provided capable of attenuating noise generated by the flow of air through the first port of the ported shroud in an efficient manner. This is because the wall section protrudes into the compressor inlet duct at a position upstream of the outlet of the recirculation channel and upstream of the first and second ports of the ported shroud.

That is, because the wall section protrudes into the compressor inlet duct at a position upstream of the outlet of the recirculation channel, the wall section can deflect and attenuate noise from the outlet of the recirculation channel, as well as from the first port of the ported shroud, in a direction towards the compressor wheel instead of in a direction towards an air inlet duct of the combustion engine. In this manner, it can be ensured that less noise propagates to the surroundings via an air inlet duct of the combustion engine.

In addition, since the compressor arrangement comprises a ported shroud as well as a recirculation channel, a compressor arrangement is provided having conditions for operating with a low amount of surge at steady state conditions, upon small changes in the pressure difference over the compressor, as well as upon more transient conditions, such as when an inlet throttle of the combustion engine is closing. This is because the ported shroud can reduce the occurrences of surge upon small changes in the pressure difference over the compressor and at steady state conditions, whereas the recirculation channel can mitigate surge at more transient conditions, such as when an inlet throttle of the combustion engine is closing. As a further result thereof, a compressor arrangement is provided having conditions for being durable and reliable.

Furthermore, since the outlet of the recirculation channel is arranged in the compressor inlet duct at a position upstream of the first and second ports of the ported shroud, instead of into the ported shroud, a great flow capacity of air can be ensured through the outlet of the recirculation channel. Moreover, the flow of air through the outlet of the recirculation channel will have a low or no impact on the rotor stability of the compressor wheel.

Accordingly, a compressor arrangement is provided overcoming, or at least alleviating, at least some of the above-mentioned problems and drawbacks. As a result, the above-mentioned object is achieved.

Optionally, the wall section is arranged adjacent to the outlet of the recirculation channel. Thereby, a compressor arrangement is provided in which noise from the outlet of the recirculation channel can be deflected in a more efficient manner. In this manner, it can be ensured that less noise propagates to the surroundings via an air inlet duct of the combustion engine.

Optionally, the outlet of the recirculation channel is arranged adjacent to the first port of the ported shroud. Thereby, a compact compressor arrangement can be provided ensuring a high flow capacity of air through the outlet of the recirculation channel, while ensuring a low impact on the rotor stability of the compressor wheel when air is flowing through the outlet of the recirculation channel. Moreover, a compressor arrangement is provided having conditions for deflecting and attenuating noise from the first port of the ported shroud in an efficient manner.

Optionally, the wall section is configured to deflect air flowing from the outlet of the recirculation channel in a direction towards the compressor wheel. Thereby, a compressor arrangement is provided in which noise from the outlet of the recirculation channel can be further reduced. This because the wall section can deflect air and noise from the outlet of the recirculation channel towards the compressor wheel. In this manner, less noise will propagate to the surroundings via an air inlet duct of the combustion engine.

Optionally, the wall section is annular. Thereby, a compressor arrangement is provided capable of attenuating noise from the outlet of the recirculation channel in a further improved manner. This is because the wall section can deflect and attenuate noise around the entire circumference of the compressor inlet duct.

Optionally, the wall section is funnel shaped. Thereby, advantageous flow characteristics can be provided through the wall section. In this manner, a compressor arrangement is provided having conditions for attenuating noise from the outlet of the recirculation channel, as well as from the first port of the ported shroud, while having a low or no effect on the performance of the compressor arrangement.

Optionally, an inner diameter of the wall section decreases along an intended flow direction of air through the wall section. Thereby, advantageous flow characteristics can be provided through the wall section. In this manner, a compressor arrangement is provided having conditions for attenuating noise from the outlet of the recirculation channel, as well as from the first port of the ported shroud, while having a low or no effect on the performance of the compressor arrangement.

Optionally, the valve is an electronically controlled valve. Thereby, an efficient control of the opening state of the valve can be provided in order to mitigate surge in an efficient manner.

According to a second aspect of the invention, the object is achieved by a turbocharger for an internal combustion engine, wherein the turbocharger comprises a compressor arrangement according to some embodiments of the present disclosure, and wherein the compressor arrangement is configured to compress air to an air inlet of the internal combustion engine. Since the turbocharger comprises a compressor arrangement according to some embodiments, a turbo charger is provided capable of ensuring that less noise is propagating to the surroundings via an air inlet duct of the combustion engine. Moreover, a turbocharger is provided having conditions for mitigating surge in an efficient manner at steady state conditions, upon small changes in the pressure difference over the compressor of the turbocharger, as well as upon more transient conditions, such as when an inlet throttle of the combustion engine is closing.

Accordingly, a turbocharger is provided overcoming, or at least alleviating, at least some of the above-mentioned problems and drawbacks. As a result, the above-mentioned object is achieved.

According to a third aspect of the invention, the object is achieved by an internal combustion engine comprising a turbocharger according to some embodiments of the present disclosure.

Since the internal combustion engine comprises a turbocharger according to some embodiments, an internal combustion engine is provided overcoming, or at least alleviating, at least some of the above-mentioned problems and drawbacks. As a result, the above-mentioned object is achieved.

According to a fourth aspect of the invention, the object is achieved by a vehicle comprising an internal combustion engine according to some embodiments of the present disclosure. Since the vehicle comprises an internal combustion engine according to some embodiments, a vehicle is provided overcoming, or at least alleviating, at least some of the above-mentioned problems and drawbacks. As a result, the above-mentioned object is achieved.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
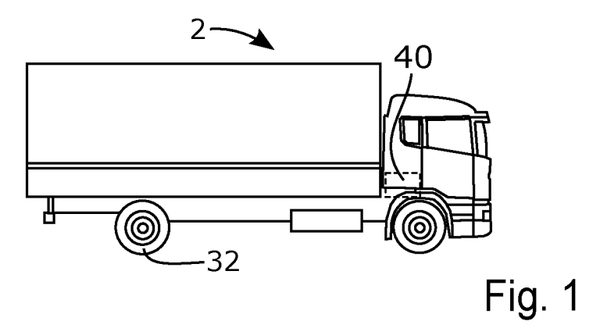
FIG. 1 schematically illustrates a vehicle according to some embodiments of the present disclosure, FIG. 2 schematically illustrates an internal combustion engine of the vehicle illustrated in FIG. 1, and FIG. 3 schematically illustrates a cross section of a compressor arrangement of a turbocharger of the combustion engine illustrated in FIG. 2.

FIG. 1 schematically illustrates a vehicle 2 according to some embodiments of the present disclosure. According to the illustrated embodiments, the vehicle 2 is a truck, i.e., a type of a heavy vehicle. However, according to further embodiments, the vehicle 2, as referred to herein, may be another type of manned or unmanned vehicle for land or water-based propulsion such as a lorry, a bus, a construction vehicle, a tractor, a car, a ship, a boat, or the like.

The vehicle 2 comprises an internal combustion engine 40. According to the illustrated embodiments, the internal combustion engine 40 is configured to provide motive power to the vehicle 2 via wheels 32 of the vehicle 2.

Figure 2:
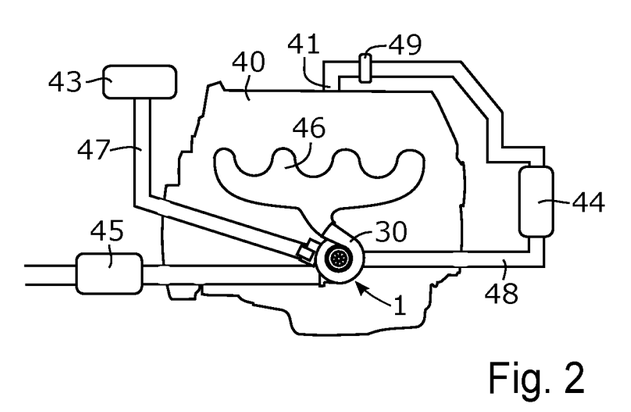

FIG. 2 schematically illustrates the internal combustion engine 40 of the vehicle 2 illustrated in FIG. 1. According to the illustrated embodiments, the internal combustion engine 40 is an Otto engine with a spark-ignition device, wherein the Otto engine may be configured to run on a gaseous fuel, petrol, alcohol, similar volatile fuels, or combinations thereof. According to further embodiments, the combustion engine 40, as referred to herein, may be a compression ignition engine, such as a diesel engine. For reasons of brevity and clarity, the internal combustion engine 40 is in some places herein referred to as the combustion engine 40, or simply the engine 40. Moreover, according to some embodiments, the combustion engine 40, as referred to herein, may be configured to power another unit or system than a vehicle, such as for example an electric generator.

The combustion engine 40 comprises a turbocharger 30, i.e., a charging device configured to compress air to an air inlet 41 of the combustion engine 40. The turbocharger 30 comprises a turbine unit configured to be driven by exhaust gas of the internal combustion engine 40 via an exhaust manifold 46 of the combustion engine 40. The turbocharger 30 further comprises a compressor arrangement 1. As is further explained herein, the compressor arrangement 1 comprises a compressor wheel connected to the turbine unit of the turbocharger 30.

According to the illustrated embodiments, the combustion engine 40 comprises an air filter unit 43 and a charge air cooler 44. The compressor wheel of the turbocharger 30 is configured to force air from the air filter unit 43 to the air inlet 41 of the combustion engine 40. The charge air cooler 44 is arranged between the compressor arrangement 1 of the turbocharger 30 and the air inlet 41 of the combustion engine 40. The charge air cooler 44 is configured to cool the compressed air before the air is conducted to the air inlet 41. In this manner, the power output and the fuel efficiency of the combustion engine 40 can be further improved. Moreover, according to the illustrated embodiments, the combustion engine 40 comprises a catalyst 45 arranged downstream of the turbine unit of the turbocharger 30.

Figure 3:
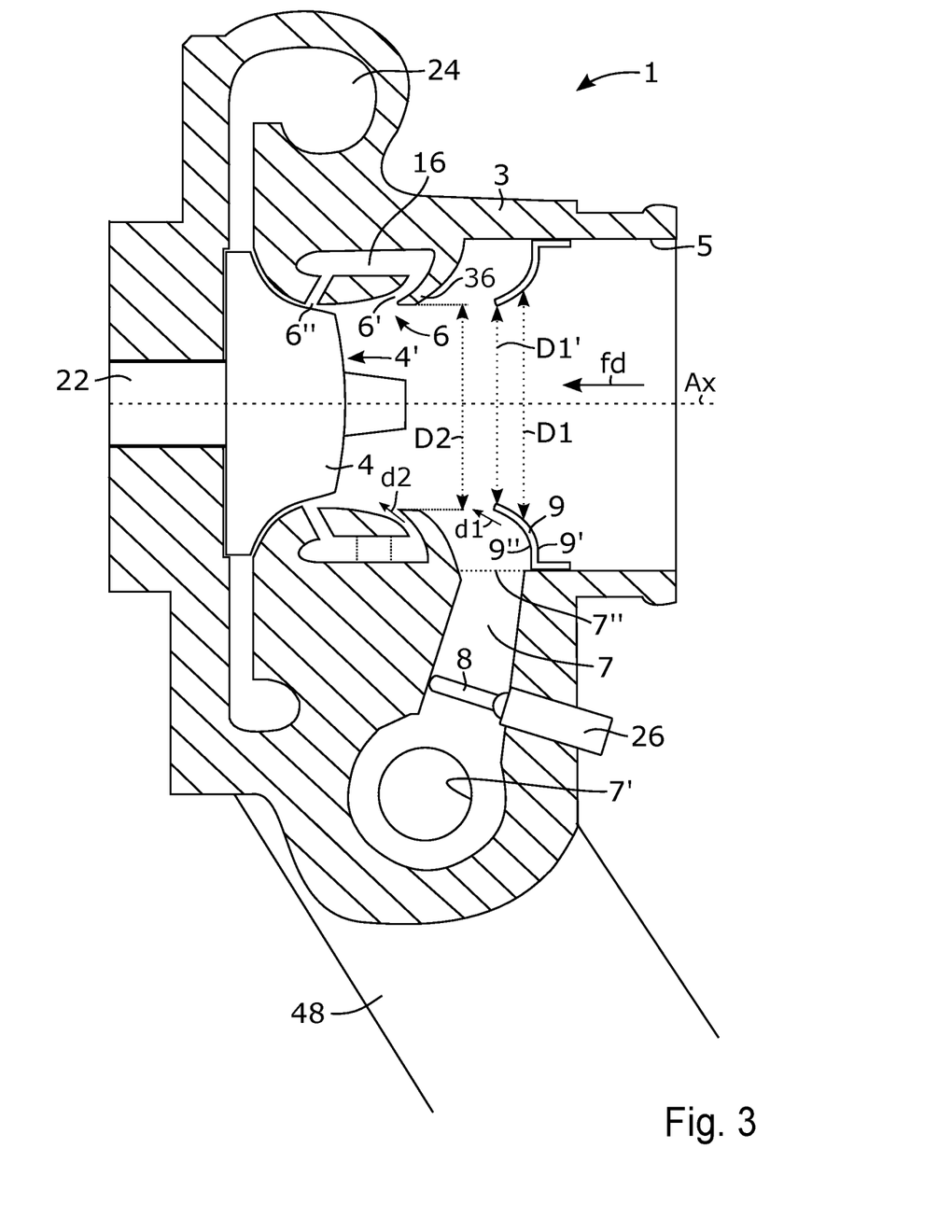

FIG. 3 schematically illustrates a cross section of the compressor arrangement 1 of the turbocharger 30 illustrated in FIG. 2. The compressor arrangement 1 comprises a compressor housing 3 and a compressor wheel 4 arranged to rotate in the compressor housing 3 around a rotation axis Ax. In FIG. 3, the cross section is made in a plane comprising the rotation axis Ax of the compressor wheel 4. The compressor wheel 4 is connected to a shaft 22 which also is arranged to rotate around the rotation axis Ax during operation of the compressor arrangement 1. Below, simultaneous reference is made to FIG. 1-FIG. 3, if not indicated otherwise. According to the illustrated embodiments, the compressor wheel 4 is connected to the turbine unit of the turbocharger 30 via the shaft 22.

The compressor housing 3 comprises a compressor inlet duct 5. The compressor inlet duct 5 is configured to conduct air along an intended flow direction fd during operation of the compressor arrangement 1 as is further explained herein. The compressor inlet duct 5 of the compressor arrangement 1 is fluidly connected to the air filter unit 43 of the combustion engine 40 via an air inlet duct 47 of the combustion engine 40. The compressor arrangement 1 further comprises a ported shroud 6. The ported shroud 6 comprises a first port 6' positioned upstream of a leading side 4' of the compressor wheel 4. The leading side 4' of the compressor wheel 4 faces in a direction substantially opposite to the intended flow direction fd indicated in FIG. 3. Thus, the leading side 4' of the compressor wheel 4 is a side of the compressor wheel 4 that first meets air flowing through the compressor inlet duct 5 in the intended flow direction fd towards the compressor wheel 4. The ported shroud 6 further comprises a second port 6". The second port 6" of the ported shroud is positioned downstream of the leading side 4' of the compressor wheel 4. Moreover, the ported shroud 6 comprises a ported shroud channel 16 extending between the first port 6' and the second port 6" of the ported shroud 6. In other words, the ported shroud channel 16 fluidly connects the first port 6' and the second port 6" of the ported shroud 6.

The wording upstream and downstream, as used herein, relates to the relative positions of objects in relation to an intended flow direction of fluid in the system, component, or circuit referred to, such as in relation to the intended flow direction fd of air through the compressor inlet duct 5 in the above given example. That is, the feature that the second port 6" of the ported shroud 6 is positioned downstream of the leading side 4' of the compressor wheel 4 means that the second port 6" of the ported shroud 6 is arranged after/behind the leading side 4' of the compressor wheel 4 as seen relative to the intended flow direction fd of air through the compressor inlet duct 5. As another example, the feature that the first port 6' of the ported shroud 6 is positioned upstream of a leading side 4' of the compressor wheel 4 means that the first port 6' is arranged before/in front of the leading side 4' of the compressor wheel 4 as seen relative to the intended flow direction fd of air through the compressor inlet duct 5.

According to the illustrated embodiments, the compressor wheel 4 is a radial compressor wheel meaning that the compressor wheel 4 is arranged to force air to flow in radial directions of the compressor wheel 4 during rotation of the compressor wheel 4 around the rotation axis Ax. The compressor arrangement 1 comprises a compressor volute 24 arranged radially outside of compressor wheel 4. The compressor volute 24 is configured to receive air from the compressor wheel 4. The compressor volute 24 is fluidly connected to an outlet duct 48 of the compressor arrangement 1. The outlet duct 48 of the compressor arrangement 1 is also indicated in FIG. 2. As can be seen in FIG. 2, the outlet duct 48 of the compressor arrangement 1 is fluidly connected to the air inlet 41 of the combustion engine 40.

Moreover, as can be seen in FIG. 3, according to the illustrated embodiments, the second port 6" is arranged radially outside of the compressor wheel 4, i.e., is arranged outside of the compressor wheel 4 as seen in a radial direction of the compressor wheel 4. Radial directions of the compressor wheel 4 may be defined as directions perpendicular to the rotation axis Ax of the compressor wheel 4. Since the second port 6" of the ported shroud 6 is arranged radially outside of the compressor wheel 4, some of the air from the compressor wheel 4 is conducted into the second port 6". The air conducted into the second port 6" flows to the first port 6' of the ported shroud 6 via the ported shroud channel 16. The ported shroud channel 16 is constantly open and there is no valve or other type of arrangement in the ported shroud channel 16 for controlling the flow of air therethrough. The ported shroud 6 can reduce the occurrences of surge upon small changes in the pressure difference over the compressor wheel 4 and at steady state conditions of the compressor arrangement 1. Moreover, the ported shroud 6 can widen the operational range of the compressor arrangement 1 and can provide a more accelerated airflow towards the leading side 4' of the compressor wheel 4 at some operational conditions of the compressor arrangement 1.

The compressor arrangement 1 further comprises a recirculation channel 7. The recirculation channel 7 is separate from the ported shroud 6 of the compressor arrangement 1. The recirculation channel 7 comprises an inlet 7' arranged downstream of the compressor wheel 4, an outlet 7" arranged in the compressor inlet duct 5 at a position upstream of the first and second ports 6', 6" of the ported shroud 6, and a valve 8 configured to control the flow of air through the recirculation channel 7. The valve 8 is controllable between an open state and a closed state. In FIG. 3, the valve is illustrated in the closed state. In the closed state, the valve hinders flow of air from the inlet 7' to the outlet 7" of the recirculation channel 7. In the open state, the valve 8 allows a flow of air from the inlet 7' to the outlet 7" of the recirculation channel 7. According to the illustrated embodiments, the compressor arrangement 1 comprises an electrical actuator 26 configured to control the valve 8 between the open and closed states. In other words, according to the illustrated embodiments, the valve 8 is an electronically controlled valve 8. According to further embodiments, the compressor arrangement 1 may comprise another type of actuator for controlling the valve 8 between the open and closed states, such as a pneumatic or hydraulic actuator.

In FIG. 3, the valve 8 and the electric actuator 26 are schematically illustrated in simplified form. As can be seen in FIG. 3, according to the illustrated embodiments, the inlet 7' of the recirculation channel 7 is formed as a hole fluidly connecting the recirculation channel 7 to the outlet duct 48 of the compressor arrangement 1. According to some embodiments, the compressor arrangement 1 may comprise a type of valve comprising a valve body which covers the hole when in the closed position and which uncovers the hole when being displaced towards the open position. According to such embodiments, the valve body may be moved in directions substantially parallel to the viewing direction of FIG. 3 when being displaced between the open and closed positions. The valve 8 of the recirculation channel 7 may also be referred to as a blow-off valve (BOV), dump valve, compressor bypass valve (CBV), or a compressor recirculation valve.

Like above, the feature that the recirculation channel 7 comprises an inlet 7' arranged downstream of the compressor wheel 4 means that the inlet 7' of the recirculation channel 7 is arranged after/behind the compressor wheel 4 as seen relative to an intended flow direction of air through the compressor arrangement 1. The intended flow direction of air through the compressor arrangement 1 is the direction of air obtained through the compressor arrangement 1 during operation of the compressor arrangement 1, i.e., when the turbine unit of the turbocharger 30 is powering the compressor wheel 4 of the compressor arrangement 1. Since the outlet duct 48 is arranged downstream of the compressor volute 24 according to the illustrated embodiments, the inlet 7' of the recirculation channel 7 is also arranged downstream of the compressor volute 24 as seen relative to the intended flow direction of air through the compressor arrangement 1.

Furthermore, like above, the feature that the outlet 7" of the recirculation channel 7 is arranged in the compressor inlet duct 5 at a position upstream of the first and second ports 6', 6" of the ported shroud 6 means that the outlet 7" of the recirculation channel 7 is arranged before/in front of the first and second ports 6', 6" of the ported shroud 6 as seen relative to the intended flow direction of air through the compressor arrangement 1. Since the outlet 7" of the recirculation channel 7 is arranged in the compressor inlet duct 5 according to the illustrated embodiments, the outlet 7" of the recirculation channel 7 is arranged before/in front of the first and second ports 6', 6" of the ported shroud 6 as seen relative to the intended flow direction fd of air through the compressor inlet duct 5.

Moreover, according to the illustrated embodiments, the recirculation channel 7 is integrated into the compressor housing 3. Therefore, the recirculation channel 7 according to the illustrated embodiments may be referred to as an internal recirculation channel 7. However, according to further embodiments, the compressor arrangement 1 may comprise a so-called external recirculation channel, i.e. a recirculation channel comprising ducts arranged outside of the housing 3 of the compressor arrangement 1. Likewise, according to the illustrated embodiments, the valve 8 of the recirculation channel 7 is arranged in the housing 3 of the compressor arrangement 1. However, the valve 8 of the recirculation channel 7 may also be arranged outside of the housing 3 of the compressor arrangement 1.

As seen in FIG. 2, the combustion engine 40 comprises an inlet throttle 49. The inlet throttle 49 is configured to restrict the airflow into the combustion engine 40 at lower output levels of the combustion engine 40. When the inlet throttle 49 is closing, such as when a driver of a vehicle comprising the combustion engine 40 is releasing an accelerator pedal of the vehicle, the pressure in the outlet duct 48 of the compressor arrangement 1 significantly increases, especially at higher rotational speeds of the compressor wheel 4. Upon high pressure differences over the compressor wheel 4, a flow instability is induced in the compressor housing 3 and air tends to go backward over the compressor wheel 4. As explained herein, this phenomenon is usually referred to as surge and can be heard as a fluttering noise.

Surge can also appear in turbochargers used in engines lacking an inlet throttle, such as many diesel engines. That is, when the injection of fuel into cylinders of the engine is reduced or cancelled, such as when a driver of the vehicle releases an accelerator pedal, the energy to the turbine of the turbocharger is reduced causing a lower rotational speed of the compressor wheel 4 and a lower flowrate of air past the turbine wheel 4. However, the charge air pressure will not drop at the same rate as the flowrate of air past the turbine wheel 4 because of the volume of pressurized air between the compressor wheel 4 and the air inlet 41 of the combustion engine 40. This causes the flowrate of air past the compressor wheel 4 to decrease faster than the pressure ratio over the compressor wheel 4, which causes surge.

However, due to the features of the compressor arrangement 1 according to the present disclosure, surge can be avoided by controlling the valve 8 of the recirculation channel 7 to the open state. In this manner, air can flow from the high-pressure side, i.e. from the side downstream of the compressor wheel 4, to the low-pressure side, i.e. the side upstream of the compressor wheel 4. If the inlet throttle 49 is moved to a more open position, the valve 8 can be controlled to the closed state to maximize the performance of the turbocharger 30. When the rotational speed of the compressor wheel 4 is high and the valve 8 of the recirculation channel 7 is controlled to the open state a high flow rate of air is obtained through the outlet 7" of the recirculation channel 7. This can generate a loud noise.

According to embodiments herein, the compressor arrangement 1 comprises a wall section 9 protruding into the compressor inlet duct 5 at a position upstream of the outlet 7" of the recirculation channel 7, i.e. at a position before/in front of the outlet 7" of the recirculation channel 7 as seen relative to the intended flow direction fd of air through the compressor inlet duct 5. Since the outlet 7" of the recirculation channel 7 is arranged upstream of the ports 6', 6" of the ported shroud 6, the wall section 9 also protrudes into the compressor inlet duct 5 at a position upstream of the ports 6', 6" of the ported shroud 6 as seen relative to the intended flow direction fd of air through the compressor inlet duct 5.

Due to these features, the wall section 9 is capable of deflecting and attenuating noise generated by the flow of air through the outlet 7" of the recirculation channel 7 as well as noise generated by the flow of air through the ports 6', 6" of the ported shroud 6. That is, as explained above, the compressor inlet duct 5 of the compressor arrangement 1 is fluidly connected to the air filter unit 43 via an air inlet duct 47 of the combustion engine 40. Thus, due to the wall section 9 protruding into the compressor inlet duct 5, less noise from the ports 6', 6" of the ported shroud 6 and from the outlet 7" of the recirculation channel 7 will propagate to the surroundings via the air inlet duct 47 of the combustion engine 40.

According to the illustrated embodiments, the wall section 9 is a flow guiding structure configured to influence the flow of air through the compressor arrangement 1, as is further explained herein. According to the illustrated embodiments, the wall section 9 is arranged adjacent to the outlet 7" of the recirculation channel 7. In more detail, according to the illustrated embodiments, the wall section 9 is arranged immediately adjacent to the outlet 7" of the recirculation channel 7. Moreover, as can be seen in FIG. 3, the wall section 9 has a bent profile such that at least a portion of the air flowing through the outlet 7" of the recirculation channel 7 is hitting the wall section 9 and is deflected by the wall section 9 in a direction d1 towards the compressor wheel 4. In other words, according to the illustrated embodiments, the wall section 9 is configured to deflect air flowing from the outlet 7" of the recirculation channel 7 in a direction d1 towards the compressor wheel 4. In this manner, the noise propagating to the surroundings via the air inlet duct 47 of the combustion engine 40 can be further reduced. In addition, more advantageous flow characteristics through the compressor arrangement 1 can be obtained where the rotation of the compressor wheel 4 can be maintained in a more efficient manner when the valve 8 of the recirculation channel 7 is controlled to the open state.

According to the illustrated embodiments, the outlet 7" of the recirculation channel 7 is arranged adjacent to the first port 6' of the ported shroud 6. Thereby, a compact compressor arrangement 1 can be provided and the wall section 9 can deflect and attenuate noise from the first port 6' of the ported shroud 6 in an efficient manner.

The wording "adjacent", as used herein, may encompass that the components or structures referred to are arranged within a couple of centimetres from each other, such as within 1-3 centimetres from each other. The wording "immediately adjacent", as used herein, may encompass that the components or structures referred to are arranged within a couple of millimetres from each other, such as within 9 millimetres, or 5 millimetres, from each other.

As can be seen in FIG. 3, the first port 6' of the ported shroud 6 is arranged such that air flowing out of the first port 6' is directed to flow in a direction d2 towards the compressor wheel 4 which also provides advantageous flow characteristics where the rotation of the compressor wheel 4 can be maintained in a more efficient manner during flow of air through the ported shroud 6. Moreover, since the first port 6' of the ported shroud 6 is arranged such that air flowing out of the first port 6' is directed to flow in a direction d2 towards the compressor wheel 4, the noise generated by the ported shroud 6 can be further reduced.

According to the illustrated embodiments, the wall section 9 comprises a first side 9' facing in a direction opposite to the intended flow direction fd through the compressor inlet duct 5 and a second side 9''' facing in a direction towards the compressor wheel 4. Due to the curvature of the wall section 9 and the position of the wall section 9 according to the illustrated embodiments of the compressor arrangement 1, the wall section 9 comprises at least a portion facing in a direction towards the outlet 7" of the recirculation channel 7. Thus, in other words, according to the illustrated embodiments, a portion of the air flowing through the outlet 7" of the recirculation channel 7 is hitting the second side 9''' of the wall section 9 and is deflected in the direction d1 towards the compressor wheel 4 by the second side 9''' of the wall section 9.

According to the illustrated embodiments, the wall section 9 is annular. In this manner, the wall section 9 can deflect and attenuate noise around the entire circumference of the compressor inlet duct 5. Moreover, according to the illustrated embodiments, the wall section 9 is formed as a separate part attached to walls of the compressor inlet duct 5. However, according to further embodiments, the wall section 9 may be integral to the compressor inlet duct 5 of the compressor arrangement 1 and may for example be provided by machining of a piece of material forming the compressor inlet duct 5 of the compressor arrangement 1.

Furthermore, according to the illustrated embodiments, the wall section 9 is funnel shaped. The wall section 9 according to the illustrated embodiments has an equal thickness measured between the first and second sides 9', 9''' thereof. However, the wall section 9 may be provided with a varying thickness measured between the first and second sides 9', 9''' thereof. Moreover, according to the illustrated embodiments, an inner diameter D1 of the wall section 9 decreases along an intended flow direction fd of air through the wall section 9. The inner diameter D1 of the wall section 9 may be measured in a plane perpendicular to the intended flow direction fd of air through the wall section 9, which coincides with the intended flow direction fd of air through the compressor inlet duct 5 according to the illustrated embodiments.

As seen in FIG. 3, according to the illustrated embodiments, the ported shroud 6 comprises a wall 36 forming a delimiting surface of the first port 6' of the ported shroud 6. The wall 36 of the ported shroud 6 is annular. The wall section 9, as referred to herein, may be configured such that the smallest inner diameter D1' thereof, is equal to, or greater than, the smallest diameter D2 of the inner surface of the wall 36 of the ported shroud 6. In this manner, it can be ensured that the wall section 9 does not restrict flow of air towards the compressor wheel 4 so as to provide no, or a minimal, effect on the performance of the compressor arrangement 1.

The wording "substantially parallel to", as used herein, may encompass that the angle between the objects referred to is less than 10 degrees, or is less than 7 degrees.

The wall section 9, as referred to herein, may also be referred to a wall, a flow guiding wall, a baffle, a flow guiding structure, or the like.

It is to be understood that the foregoing is illustrative of various example embodiments and that the invention is defined only by the appended independent claims. A person skilled in the art will realize that the example embodiments may be modified, and that different features of the example embodiments may be combined to create embodiments other than those described herein, without departing from the scope of the present invention, as defined by the appended independent claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A compressor arrangement for a turbocharger, wherein the compressor arrangement comprises:
   a compressor housing and a compressor wheel arranged to rotate in the compressor housing, wherein the compressor housing comprises a compressor inlet duct and a ported shroud, the ported shroud including a first port positioned upstream of a leading side of the compressor wheel, a second port positioned downstream of the leading side of the compressor wheel, and a ported shroud channel extending between the first port and the second port, and wherein the compressor arrangement further comprises a recirculation channel comprising: an inlet arranged downstream of the compressor wheel, an outlet arranged in the compressor inlet duct at a position upstream of the first and second ports of the ported shroud, and a valve configured to control the flow of air through the recirculation channel, and wherein the compressor arrangement further comprises a wall section protruding into the compressor inlet duct at a position upstream of the outlet of the recirculation channel.

2. The compressor arrangement according to claim 1, wherein the wall section is arranged adjacent to the outlet of the recirculation channel.

3. The compressor arrangement according to claim 1, wherein the outlet of the recirculation channel is arranged adjacent to the first port of the ported shroud.

4. The compressor arrangement according to claim 1, wherein the wall section is configured to deflect air flowing from the outlet of the recirculation channel in a direction towards the compressor wheel.

5. The compressor arrangement according to claim 1, wherein the wall section is annular.

6. The compressor arrangement according to claim 5, wherein the wall section is funnel shaped.

7. The compressor arrangement according to claim 1, wherein an inner diameter of the wall section decreases along an intended flow direction of air through the wall section.

8. The compressor arrangement according to claim 1, wherein the valve is an electronically controlled valve.

9. A turbocharger for an internal combustion engine, wherein the turbocharger comprises a compressor arrangement configured to compress air to an air inlet of the internal combustion engine, said compressor arrangement comprising a compressor housing and a compressor wheel arranged to rotate in the compressor housing, wherein the compressor housing comprises a compressor inlet duct and a ported shroud, the ported shroud including a first port positioned upstream of a leading side of the compressor wheel, a second port positioned downstream of the leading side of the compressor wheel, and a ported shroud channel extending between the first port and the second port, and wherein the compressor arrangement further comprises a recirculation channel comprising: an inlet arranged downstream of the compressor wheel, an outlet arranged in the compressor inlet duct at a position upstream of the first and second ports of the ported shroud, and a valve configured to control the flow of air through the recirculation channel, and wherein the compressor arrangement further comprises a wall section protruding into the compressor inlet duct at a position upstream of the outlet of the recirculation channel.

10. An internal combustion engine comprising a turbocharger, wherein the turbocharger comprises a compressor arrangement configured to compress air to an air inlet of the internal combustion engine, said compressor arrangement comprising a compressor housing and a compressor wheel arranged to rotate in the compressor housing, wherein the compressor housing comprises a compressor inlet duct and a ported shroud, the ported shroud including a first port positioned upstream of a leading side of the compressor wheel, a second port positioned downstream of the leading side of the compressor wheel, and a ported shroud channel extending between the first port and the second port, and wherein the compressor arrangement further comprises a recirculation channel comprising: an inlet arranged downstream of the compressor wheel, an outlet arranged in the compressor inlet duct at a position upstream of the first and second ports of the ported shroud, and a valve configured to control the flow of air through the recirculation channel, and wherein the compressor arrangement further comprises a wall section protruding into the compressor inlet duct at a position upstream of the outlet of the recirculation channel.

11. A vehicle comprising an internal combustion engine comprising a turbocharger, wherein the turbocharger comprises a compressor arrangement configured to compress air to an air inlet of the internal combustion engine, said compressor arrangement comprising a compressor housing and a compressor wheel arranged to rotate in the compressor housing, wherein the compressor housing comprises a compressor inlet duct and a ported shroud, the ported shroud including a first port positioned upstream of a leading side of the compressor wheel, a second port positioned downstream of the leading side of the compressor wheel, and a ported shroud channel extending between the first port and the second port, and wherein the compressor arrangement further comprises a recirculation channel comprising: an inlet arranged downstream of the compressor wheel, an outlet arranged in the compressor inlet duct at a position upstream of the first and second ports of the ported shroud, and a valve configured to control the flow of air through the recirculation channel, and wherein the compressor arrangement further comprises a wall section protruding into the compressor inlet duct at a position upstream of the outlet of the recirculation channel.

* * * * *